United States Patent
Van Cleve

(10) Patent No.: US 6,363,794 B1
(45) Date of Patent: Apr. 2, 2002

(54) METHOD AND APPARATUS FOR CORIOLIS FLOWMETER HAVING AN ACCURACY ENHANCING BALANCE BAR

(75) Inventor: Craig Brainerd Van Cleve, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/373,865

(22) Filed: Aug. 13, 1999

(51) Int. Cl.$^7$ ................................................. G01F 1/32
(52) U.S. Cl. ................................................. 73/861.357
(58) Field of Search ..................... 73/861.356, 861.357, 73/861.355

(56) References Cited

U.S. PATENT DOCUMENTS

| | | |
|---|---|---|
| 5,691,485 A | 11/1997 | Endo et al. |
| 5,850,039 A | 12/1998 | Van Cleve et al. |
| 5,969,265 A | * 10/1999 | VanCleve et al. ...... 73/861.357 |
| 5,987,999 A | * 11/1999 | VanCleve et al. ...... 73/861.357 |

FOREIGN PATENT DOCUMENTS

| | | |
|---|---|---|
| EP | 0 831 306 A1 | 3/1998 |
| EP | 0 908 705 A2 | 4/1999 |

* cited by examiner

Primary Examiner—Benjamin R. Fuller
Assistant Examiner—Jewel V. Thompson
(74) Attorney, Agent, or Firm—Faegre & Benson LLP

(57) ABSTRACT

A single tube Coriolis flowmeter having a flow tube and balance bar vibrated in-phase opposition. Material flow through the vibrating flow tube induces Coriolis deflections in the flow tube which, via brace bars, induces in-phase Coriolis like deflection in the balance bar. A balance bar resonator coupled to the balance bar is excited to vibrate in a rotational mode out of phase with respect to the balance bar. The vibration of the balance bar resonator increases the accuracy of the flowmeter output data by 1) increasing meter flow sensitivity by applying torque to the balance bar to reduce its in-phase Coriolis like deflections; 2) by applying torque to the flow tube via the balance bar to reduce shaking of the flowmeter; and 3) causing the flowmeter to have a flat calibration factor with respect to changed in material density.

24 Claims, 8 Drawing Sheets

METHOD AND APPARATUS FOR CORIOLIS FLOWMETER HAVING AN ACCURACY ENHANCING BALANCE BAR

FIELD OF THE INVENTION

This invention relates to a single tube Coriolis flowmeter and in particular, to a method and apparatus for a Coriolis flowmeter having a balance bar that enhances the accuracy of the flowmeter by increasing the flow sensitivity, reducing the meter shaking with flow, and making the meter flow sensitivity independent of material density.

Problem

Single tube Coriolis flowmeters are desirable because they eliminate the expense and the problems of flow splitting manifolds of dual tube Coriolis flowmeters. Single tube Coriolis flowmeters have the disadvantage that their flow sensitivity is lower than that of dual tube Coriolis flowmeters. The flow sensitivity is lower for two reasons. The first is that a single tube flowmeter must have a larger diameter flow tube for a given flow rate. This makes it stiffer in bending and less responsive to Coriolis forces. The second reason has to do with the details of how the mass flow rate is determined and the fact that the balance bar does not experience Coriolis force.

In dual tube Coriolis flowmeters, the flow tubes are vibrated out of phase with each other. The dual flow tubes counterbalance each other to create a dynamically balanced structure. Velocity sensors (pick offs) are located at two locations along the flow tubes to sense the relative velocity between the flow tubes. The pick offs are usually located equal distances upstream and downstream from the tubes' midpoints. Each pickoff consists of a magnet fastened to one flow tube and a coil fastened to the other. The relative motion of the coil through the magnetic field produces a voltage. The sinusoidal motion of the vibrating flow tubes produces a sinusoidal voltage in each pickoff. When there is no material flow, the voltages from the two pick offs are in-phase with each other. With material flow, the vibrating tubes are distorted by the Coriolis force of the moving material to cause a phase difference between the two pickoff voltages. The mass flow rate is proportional to this phase difference. It is important to note that both flow tubes are distorted equally (for an equal division of flow) and each flow tube has the same phase shift as the other at corresponding locations. The upstream pickoff magnet velocity has the same phase as the upstream coil velocity and both have the same phase as the voltage generated by the magnet-coil pickoff pair. The downstream pickoff has a different phase than the upstream pickoff; but the phase of the magnet velocity, the coil velocity, and the output voltage of the downstream pickoff are equal to each other.

In most single tube flowmeters, the vibrating flow tube is counterbalanced by a balance bar rather than another flow tube. The exception is Coriolis flowmeters in which a flow tube is driven in the second bending mode with the flow tube being counterbalanced by a pendulum attached to the flow tube. EP 0 908 705 A2 discloses a Coriolis flowmeter that uses a single pendulum as a counterbalance. A Coriolis flowmeter using a pair of pendulums affixed to a flow tube as counterbalances is shown in Japanese document PHD11-44564.

In Coriolis flowmeters driven in the first bending mode and counterbalanced by a balance bar, the pickoff magnets (or coils) are mounted to the balance bar as though it were the second flow tube described above. However, since material does not flow through the balance bar, it does not experience any Coriolis force. The balance bar does experience some torque from the Coriolis induced deflection of the flow tube, but the resultant small deflection of the balance bar results in a small phase shift at each pickoff location on the balance bar that is of the opposite sign as the phase shift at the pickoff locations on the flow tube. The pick offs sense the relative velocity between the phase shifted flow tube and the oppositely phase shifted balance bar.

To determine the phase of the output signal, the flow tube and balance bar velocities at each pickoff are represented by velocity vectors having phase angle and amplitude. The relative velocity (and voltage out of each pickoff) can be determined by adding the two velocity vectors. The flow tube velocity vector has a phase shift due to material flow. The balance bar velocity vector has a small phase shift of opposite sign. Adding these vectors gives the net phase shift with flow of the pickoff. The net phase shift and output voltage of each pickoff is reduced by the oppositely phase shifted balance bar. This net phase shift reduction equates to a reduction in the flow sensitivity of the flowmeter.

All straight tube Coriolis flowmeters have a problem in that the flow tube geometry is inherently stiff and cannot be bent or deflected along its longitudinal axis with the same ease as can a conventional u-tube flowmeter. Single straight tube meters have an additional problem in that the single tube diameter must be increased over the diameter of the dual tubes in order to pass the same flow with the same pressure drop through the meter. The increased tube diameter stiffens the flow tube further. As a result, the flow tube of a single straight tube meter is inherently insensitive to Coriolis forces because of its stiffness. The reduction in flowmeter sensitivity due to the opposite phase shift of the balance bar combined with the reduction in sensitivity due to the larger (single) flow tube diameter results in a combined flowmeter sensitivity so low as to impair the accuracy and commercial acceptance of single tube flowmeters for some applications.

It is a further problem that existing single tube Coriolis flowmeters use balance bars to counter balance the vibrating mass of the flow tube. In order to maintain a dynamic balance over a range of material densities, the ratio of the flow tube vibration amplitude to the balance bar vibrational amplitude changes as material density changes. As the material density increases, the flow tube vibration amplitude decreases and the balance bar vibration amplitude increases so as to maintain equality in the momentum of the two vibrating members. The change in amplitude ratio between the flow tube and the balance bar changes the phase difference between the two pickoff signals in a manner that is best understood by using a vector diagram to predict the output of each pickoff. The net output signal out of the pickoff is a result of the vector addition of the phase shifted velocity of the flow tube and the oppositely phase shifted velocity of the balance bar. As the amplitude ratio changes with increasing material density, the length of the flow tube velocity vector decreases and the length of the balance bar velocity vector increases. The sum of these two vectors, which is proportional to the pickoff output decreases in-phase shift as the length and thus importance of the oppositely phase shifted balance bar grows. This decrease in-phase shift of the pickoff output results in a decrease in meter sensitivity with material density.

It is known to decrease flow sensitivity with the increase in material density. In the prior art method the balance bar has its stiffness reduced in a region on either side of the driver. The stiffness reduction causes the distortion of the balance bar in response to the Coriolis deformation of the flow tube to be greatly increased. It also causes the resonant frequency of the second bending mode of the balance bar to be reduced so that it is closer to, but still above, the drive frequency. (The second bending mode has the same deformed shape as the balance bar takes in response to the Coriolis deformation of the flow tube.) By properly sizing the frequency separation between the drive frequency and the resonant frequency of the second bending mode, a change in flow sensitivity with density cancels the change in flow sensitivity caused by the change in amplitude ratio with density. The problem with this method, however, is that the balance bar deformation due to the flow tube Coriolis deformation is much larger. Because the balance bar deformation results in a phase shift that is opposite to the phase shift caused by flow, a greater reduction in flow sensitivity results.

It is also known to make flow sensitivity independent of material density by using the same method of removing stiffness from the balance bar, but by removing enough stiffness to move the balance bar second bending mode resonant frequency below the drive frequency. This causes the Coriolis like deformation of the balance bar to shift phase by 180 degrees so that the phase associated with the deformation adds to the phase of the flow tube. Unfortunately, in practice it is extremely difficult to lower the second bending resonant frequency enough to give a sensitivity independent of material density.

A further disadvantage of the single straight tube Coriolis flowmeter is that the Coriolis force applied to the flow tube is unbalanced and results in flowmeter vibration and in flowmeter mounting sensitivity. The Coriolis force associated with mass flow is proportional to the flow rate. The Coriolis force on the inlet and outlet halves of the flow tube are equal but opposite in sign. This results in a rocking couple or torque on the flow tube. In dual tube meters, the rocking couple on the two tubes are in opposite directions and cancel each other. In single tube meters the balance bar experiences no Coriolis force so the rocking couple on the flow tube remains unopposed. This causes the flowmeter to shake an increased amount with increased flow rate. The shaking is at the meter drive frequency so that tube accelerations caused by the meter shaking are indistinguishable from Coriolis acceleration of the material. Furthermore, the meter shaking acceleration is added or subtracted from the Coriolis acceleration resulting in a measurement error. Meter mounting stiffness compounds the problem because the amount of meter shaking is inversely proportional to the mounting stiffness.

In summary, prior art single straight tube Coriolis flowmeters have reduced accuracy which the present invention addresses. These problems are low flow sensitivity, a flow sensitivity that changes with material density, and meter shaking due to unbalanced torque resulting from the Coriolis forces.

Solution

The above and other problems are solved and an advance in the art is achieved by the present invention in accordance with which a method and apparatus for a single straight tube Coriolis flowmeter is provided having a balance bar that includes an additional dynamic structure, termed a balance bar resonator. The resonator performs three functions that enhance the accuracy of output information generated by the flowmeter.

The first such function is that the balance bar resonator generates torques that are applied via the balance bar to the flow tube to counteract the torques applied to the flow tube by the Coriolis forces. This reduces the shaking of the flowmeter caused by the applied Coriolis forces. The second such function performed by the balance bar resonator is that the application of resonator torques to the balance bar reduces the amplitude of the Coriolis like deflections imparted to the balance bar by the Coriolis deflections of the flow tube. The balance bar resonator, is affixed to the longitudinal center of the balance bar to cancel in-phase Coriolis like deflections induced in the balance bar by the Coriolis deflections of the flow tube. These flow tube deflections generate in-phase Coriolis like deflections in the balance bar which, in turn, decrease flowmeter sensitivity. The reduction of the amplitude of these Coriolis like deflections by the balance bar resonator thus enhances flowmeter sensitivity. The third such function performed by the torques is to provide for a flat flowmeter calibration factor over a range of material densities as subsequently discussed.

The balance bar resonator consists of a relatively rigid bar oriented parallel to and beside the balance bar. The balance bar resonator bar may have weights affixed to its ends (if necessary) to reduce the resonant frequency of the working mode of the balance bar resonator. The balance bar resonator is coupled at its center to the center of the balance bar by a member called a strut. The balance bar resonator and the strut lie in the plane of vibration of the flow tube and balance bar in their drive mode. The working mode of the balance bar resonator is a rotational mode of vibration in which the rigid resonator bar rotates in the drive plane as the strut bends. The working mode of the balance bar resonator has a resonant frequency that is spaced apart and lower than the drive frequency.

The drive vibrations do not excite the working mode of the balance bar resonator because the longitudinal center of the balance bar, to which the strut is affixed, experiences no rotation, only translation. The strut translation with the balance bar causes balance bar resonator translation but does not excite working mode rotational vibrations in the balance bar resonator because the balance bar resonator bar is rigid and symmetrical about the strut. It takes the Coriolis like deflections of the balance bar to excite the working mode vibrations in the balance bar resonator. These deflections cause rotation of the balance bar center and bending of the balance bar resonator strut. Because the resonant frequency of the working mode of the balance bar resonator is lower than the frequency of the application of the Coriolis like deflections (the drive frequency), the balance bar resonator vibrates out of phase with the Coriolis like deflections of the balance bar. The bending of the strut thus applies a torque to the center of the balance bar that tends to decrease the rotation of the center of the balance bar and the amplitude of the Coriolis like deflections of the balance bar. The balance bar resonator works like a dynamic balancer of the balance bar in the rotation mode of the balance bar resonator. The balance bar resonator is also like a dynamic balancer in that the degree to which it reduces the Coriolis like deflection of the balance bar is inversely proportional to the separation of the drive frequency from the resonant frequency of the working mode. A very close spacing results in nearly complete cancellation of the Coriolis like deflection while a larger separation results in a lesser degree of cancellation. Since the Coriolis like deflections of the balance bar results in a decrease in meter sensitivity to flow, the cancellation of the deflection by the balance bar resonator increases the meter flow sensitivity.

The change in the degree of cancellation with frequency separation can be used to eliminate the change in meter flow sensitivity with material density. It has been previously shown how the change in flow tube/balance bar amplitude ratio causes the meter sensitivity to decrease with increasing material density. It has also been shown how the balance bar resonator reduces the Coriolis like deflections of the balance bar to a degree that is inversely proportional to the frequency separation between the drive frequency and the resonant frequency of the working mode. The balance bar resonator can be used to make the flow sensitivity independent of material density by using the frequency separation property along with the fact that the resonant drive frequency of the meter decreases as the material density increases.

When the material density increases, the drive frequency decreases. Since the resonant frequency of the working mode of the balance bar resonator is below the drive frequency and since it is independent of material density, the material density increase causes a decrease in the frequency separation between the drive frequency and the resonant frequency of the working mode. The decrease in frequency separation causes an increase in the amplitude of the balance bar resonator and a decrease in the Coriolis like deflections of the balance bar. This decrease causes an increase in sensitivity of the meter with material density. This increase in meter sensitivity with increasing density can be made to just cancel the decrease in meter sensitivity with density caused by the changing amplitude ratio. The increase in sensitivity with density caused by the balance bar resonator is greatest when the drive frequency with the high density material is equal to or slightly greater than the resonant frequency of the working mode. Increasing the separation with the high density material results in a lesser increase in sensitivity with density. Thus the increase in sensitivity due to the balance bar resonator can be made to cancel the decrease in sensitivity by the proper initial spacing between the drive frequency and the resonant frequency of the balance bar resonator.

As discussed, the balance bar resonator applies a torque to the balance bar to optimize flow sensitivity or make the flow sensitivity independent of changes in material density. This torque is proportional to and opposite to the Coriolis torque that is applied to the flow tube by the material flow. Even though the balance bar resonator torque is applied to the balance bar and the material torque is applied to the flow tube, both are ultimately applied to the meter case and flanges. The balance bar resonator torque thus reduces the net torque on the case and results in less meter shaking and less of the error associated meter with meter shaking.

Aspects of the invention comprise a method of operating and apparatus defining a Coriolis flowmeter adapted to receive a material flow and having:

a flow tube and a balance bar oriented substantially parallel to said flow tube;

brace bar means coupling end portions of said balance bar to said flow tube;

balance bar resonator means coupled to said balance bar;

a driver that vibrates said flow tube and balance bar out of phase with respect to each other in a drive mode having a frequency substantially equal to the resonant frequency of said material filled flow tube and said balance bar;

said material flow applies periodic Coriolis forces to said vibrating flow tube to generate periodic Coriolis deflections of said flow tube that are characterized by regions of deflection as well as nodes having no deflection;

said brace bar means is responsive to said Coriolis deflections of said flow tube to generate periodic Coriolis like deflections of said balance bar that are characterized by regions of deflection as well as nodes having no deflection;

said Coriolis like deflections of said balance bar are in-phase with and have the same number of nodes as said periodic Coriolis deflections of said flow tube;

said Coriolis like deflections include a rotation of a longitudinal center portion of said balance bar;

said in-phase Coriolis like deflections of said balance bar excite said balance bar resonator means to vibrate in a rotational mode out of phase with respect to said rotation of said longitudinal center portion of said balance bar;

apparatus whereby the vibration of said balance bar resonator means in said rotational mode applies torque to said balance bar that increases the accuracy of output information generated by said Coriolis flowmeter;

pickoff means coupled to said flow tube that generate signals of increased accuracy representing a vibrational velocity of said flow tube with respect to a vibrational velocity of said balance bar; and meter electronics that derives information regarding said material flow in response to said generation of said signals of increased accuracy.

A further aspect is apparatus that increases the accuracy of said output information of said Coriolis flowmeter comprises:

apparatus, including said balance bar resonator means, that applies torque from said balance bar resonator means to said balance bar to decrease the amplitude of said Coriolis like deflections of said balance bar;

apparatus that increases the relative velocity of said Coriolis deflections of said flow tube with respect to said in-phase Coriolis like deflections of said balance bar in response to said decrease of said amplitude of said in-phase Coriolis like deflections of said balance bar; and apparatus which increases the flow sensitivity of said Coriolis flowmeter in response to said increase in said relative velocity of Coriolis deflections of said flow tube with respect to said in-phase Coriolis like deflections of said balance bar.

A further aspect is that said Coriolis forces apply torque to said flow tube that causes shaking of said Coriolis flowmeter; said apparatus that increases the accuracy of said output information of said Coriolis flowmeter comprises:

apparatus that extends said torque applied by said balance bar resonator means to said balance bar and via said balance bar to said flow tube to reduce the torque applied by said flow tube to meter mounts of said Coriolis flowmeter;

said reduction of said torque applied by said flow tube to said meter mounts is effective to reduce the shaking of said Coriolis flowmeter.

A further aspect is that said apparatus that increases the accuracy of said output information of said Coriolis flowmeter comprises:

apparatus that detects a change in the resonant frequency of said vibrating flow tube and said balance bar resulting from a change in the density of said flowing material;

apparatus that changes the vibrational amplitude ratio of said flow tube and said balance bar in response to said detection of said change in material density;

apparatus that changes the material flow sensitivity of said Coriolis flowmeter in a first direction in response to said change in vibrational amplitude ratio;

apparatus that alters the vibrational amplitude of said balance bar resonator to change said material flow sensitivity in a second direction in response to said change in said resonant frequency;

said changes in flow sensitivity in said first direction and in said second direction are effective to achieve a flow calibration factor of said Coriolis flow meter.

A further aspect is that said apparatus that induces said in-phase Coriolis like deflections in said balance bar includes apparatus that extends forces indicative of said periodic Coriolis deflections from said flow tube through said brace bar means to said balance bar to induce said in-phase Coriolis like deflections in said balance bar.

A further aspect includes apparatus that couples said balance bar resonator means to said longitudinal center portion of said balance bar.

A further aspect is that said balance bar resonator means comprises:

an elongated bar substantially parallel to said balance bar at a rest state of said Coriolis flowmeter;

a stub coupling said elongated bar to the longitudinal center portion of said balance bar;

the vibration of said balance bar resonator means with respect to said longitudinal center portion of said balance bar applies torque to said balance bar.

A further aspect is that said applied axial torque from said balance bar resonator reduces the amplitude of said in-phase Coriolis like deflections of said balance bar to increase the flow sensitivity of said Coriolis flowmeter.

A further aspect is that said applied torque of said balance bar resonator is extended from said balance bar via brace bars to said flow tube to reduce the shaking of said Coriolis flowmeter.

A further aspect-is that said resonator bar includes mass.

A further aspect is that said mass comprises mass element affixed to ends of said resonator bar.

A further aspect is that said balance bar resonator means comprises said stub which is couples said elongated bar to said longitudinal center of said balance bar on a bottom surface of said balance bar.

A further aspect is that said balance bar resonator means comprises a first and a second balance bar resonator each comprising a and an elongated bar;

said stub of said first balance bar resonator is coupled to said longitudinal center of said balance bar on a first side of said balance bar and said stub of said second balance bar resonator is coupled to said longitudinal center of said balance bar on a second side of said balance bar.

A further aspect is that said apparatus that induces said in-phase Coriolis like deflection in said balance bar includes:

apparatus that flexes ends of said flow tube in response to said periodic Coriolis deflections to flex a first end of a brace bar means; and apparatus that flexes a second end of said brace bar in response to said flexing of said first end to induce said in-phase Coriolis like deflections in said balance bar.

Yet another aspect is a method of operating a Coriolis flowmeter adapted to receive a material flow and having a flow tube and a balance bar that is oriented substantially parallel to said flow tube; said Coriolis flowmeter has brace bar means coupling said balance bar to said flow tube and further has a balance bar resonator means coupled to a longitudinal center portion of said balance bar; said method comprising the steps of:

flowing material through said flow tube;

vibrating said flow tube and balance bar out of phase with respect to each other in a drive mode having a drive frequency substantially equal to the resonant frequency of said material filled flow tube and said balance bar;

said flowing material applies periodic Coriolis forces to said vibrating flow tube to generate periodic Coriolis deflections of said balance bar that are characterized by regions of deflection as well as nodes having no deflection;

inducing in-phase Coriolis like deflections in said balance bar at said drive frequency in response to said Coriolis deflections of said flow tube;

said Coriolis like deflections include a rotation of said longitudinal center portion of said balance bar;

said Coriolis like deflections being in-phase with and having the same number of nodes as said periodic Coriolis deflections of said flow tube;

said Coriolis like deflections of said balance bar excite said balance bar resonator means to vibrate in a rotational mode out of phase with respect to said rotation of longitudinal center portion of said balance bar;

the rotational mode vibration of said balance bar resonator means applies torque to said balance bar to increase the accuracy of output information generated by said Coriolis flowmeter;

operating pick offs that generate signals of increased accuracy representing a vibrational velocity of said flow tube with respect to a vibrational velocity of said balance bar; and deriving information of increased accuracy regarding said material flow in response to said generation of said signals of increased accuracy.

DESCRIPTION OF THE DRAWINGS

The above and other advantages and features of the invention may be better understood from a reading of the following detailed description thereof taking in conjunction with the drawings in which.

DETAILED DESCRIPTION

The method and apparatus of the present invention overcomes the problems of low sensitivity, meter vibration, and a flow calibration factor that varies with material density in single tube flowmeters by the provision of a structure on the balance bar that amplifies flowmeter sensitivity, reduces meter vibration, and reduces the variation in the flow calibration factor with material density. In order to understand how this is done it is necessary to understand the nature of the Coriolis force on the flow tube, the distortion this produces in the flow tube, and how the distortion results in-phase shift along the flow tube.

Figure 1:
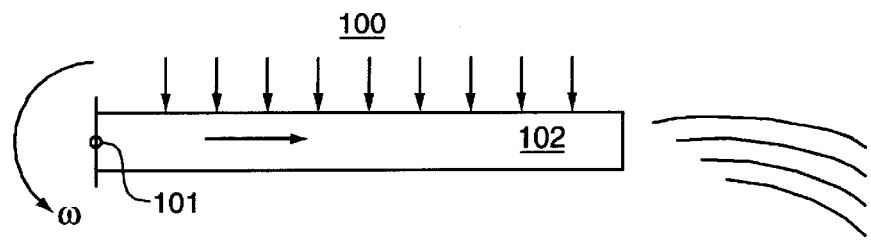
FIG. 1 discloses a rotating flow tube.
Figure 2:
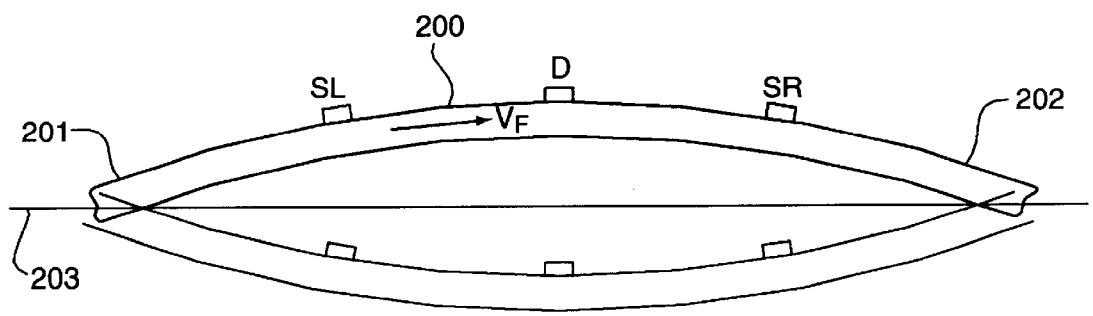
FIG. 2 discloses a vibrating flow tube.
Figure 3:
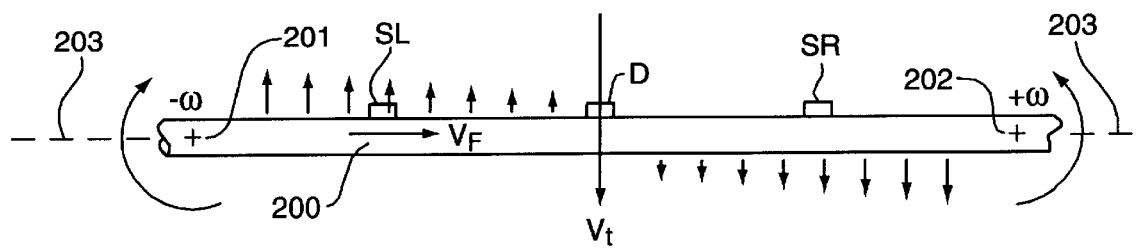
FIG. 3 discloses the Coriolis force on a vibrating tube with flow.

Description of FIGS. 1, 2 and 3

FIG. 1 shows a tube 102 through which material flows as tube 102 rotates counterclockwise about its end 101. The Coriolis force per unit length of tube 102 can be derived from the equation for Coriolis acceleration $A_c$ and Newton's law.

Coriolis acceleration may be expressed as:

$$Ac = 2(\vec{\omega} \times \vec{V})$$

ω=angular velocity
v=material velocity

Coriolis Force $F_c$ may be expressed as:

$$Fc = MAc = 2M(\vec{\omega} \times \vec{V})$$

M=material mass
since material $M = \rho A_t l$

ρ=material density
$A_t$=tube flow area
l=tube length $$Fc = 2\rho A_t l (\vec{\omega} \times \vec{V})$$

$$\frac{F_c}{l} = 2\rho A_t (\vec{\omega} \times \vec{v})$$

but:

$$\rho A_t \vec{V} = \dot{M}$$

$\dot{M}$=mass flow rate $$\frac{F_c}{l} = 2\dot{M} \times \vec{\omega}$$

The Coriolis force $F_c$ is uniform along the length of tube 102 because each part of tube 100 is rotating at the same rate and the mass flow rate is the same throughout the tube.

FIG. 2 shows a straight flow tube 200 that is free to pivot about ends 201 and 202 but is fixed in translation at ends 201 and 202. Flow tube 200 is vibrated about axis 203 by driver D in the first bending mode at its resonant frequency, like a guitar string, while material flows through it. As the flow tube passes through its straight axis 203 (zero displacement) downwards, it's left half rotates clockwise while its right half rotates counterclockwise. The rotations decrease as the tube's center is approached. The center does not rotate but merely translates. The spacial distribution of Coriolis forces on the flow tube 200 as it passes through zero displacement axis 203 is shown on FIG. 3. The Coriolis force is in opposite directions on the two flow tube halves because the tube rotation directions are opposite. The Coriolis force diminishes to zero at the center because the rotation of the flow tube diminishes to zero at the center.

Another major difference between the vibrating flow tube 200 of FIG. 2 and the rotating tube 102 of FIG. 1 is that vibrating tube 200 does not rotate continuously, but stops and reverses direction. At the vibration direction reversal, the rotations are zero and the Coriolis force on the entire flow tube is zero. The result is that the magnitude of the Coriolis forces of FIG. 3 vary sinusoidally with time with the maximum occurring as the flow tube vibration goes through zero amplitude and maximum velocity as shown on FIG. 3. Zero Coriolis force occurs on the entire flow tube as the flow tube reaches its maximum vibration amplitude and zero velocity in the first bending (drive) mode. The frequency of the sinusoidal application of the Coriolis force to the flow tube is the same as the frequency at which it is being vibrated by driver D; namely, the flow tube's first bending (drive) mode vibration frequency.

Figure 4:
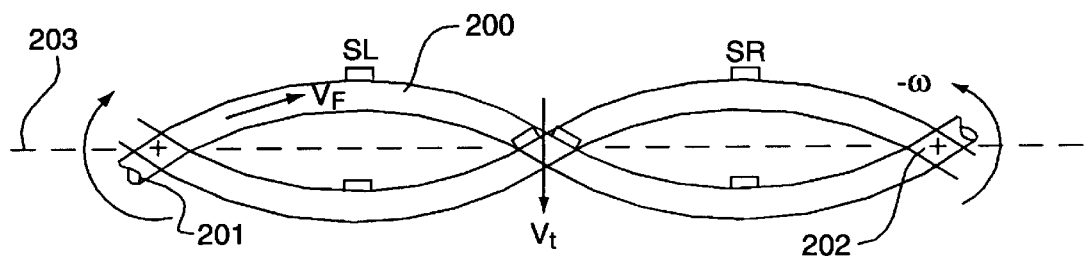
FIG. 4 discloses the Coriolis deformation of a vibrating tube with flow.

Description of FIG. 4

Flow tube 200 deflects in response to the applied periodic Coriolis force as shown in FIG. 4. The solid line shows the shape (greatly exaggerated) the flow tube takes in response to the Coriolis force as the flow tube passes downward through zero displacement axis 203 in the drive mode. The dashed line shows the shape the flow tube takes as it moves upward through zero displacement in the drive mode. Note that the only point on the flow tube that is in fact passing through zero at this instant is the mid point of the tube. The shape of FIG. 4 is similar to the second bending mode shape. However, this is just a coincidence. The frequency of the second bending mode of the flow tube is much higher than the frequency at which the Coriolis force of FIG. 3 is applied (the drive frequency of the first bending mode). Since the flow tube is being excited by Coriolis forces at well below its second bending resonant frequency, this Coriolis caused deformation of FIG. 4 and the Coriolis force of FIG. 3 occur in-phase with each other. Flow tube 200 therefore assumes the shape of FIG. 4 as it crosses zero displacement axis 203 in its driven vibration (first bending) mode.

Figure 5:
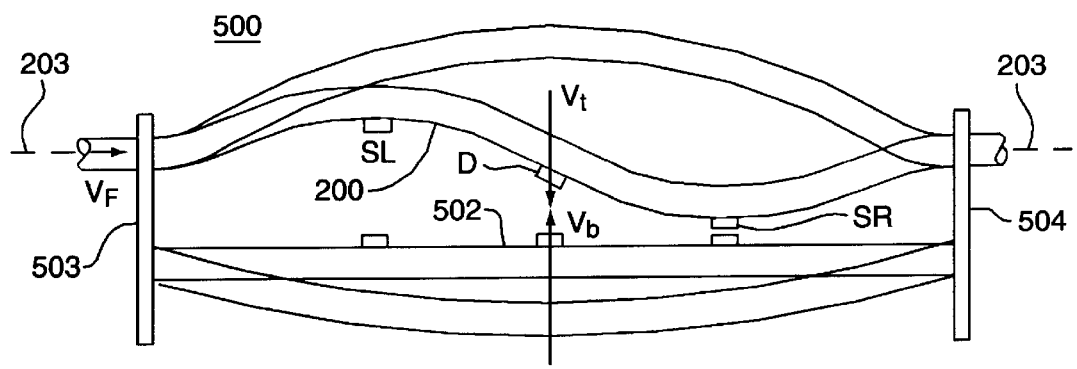
FIG. 5 discloses the Coriolis deformation of an idealized prior art meter with flow.

Description of FIG. 5

Material flow superimposes the Coriolis induced vibration of FIG. 4 on the driven vibration of FIG. 2. This is shown on FIG. 5. Both vibrations occur at the first bending mode drive frequency; but they are phase shifted from each other by ninety degrees. The Coriolis induced displacement maximum (solid lines) occurs when the first bending mode is at zero displacement along axis 203. The Coriolis displacement becomes zero when the first bending mode is at maximum displacement (dashed lines). FIG. 5 is analogous to FIG. 3 in that it represents the state of the flow tube in so far as Coriolis deflections are concerned at the time flow tube 200 crosses zero axis 203. At this time, and at this time only, the Coriolis forces and Coriolis induced deflections are at a maximum amplitude. As already explained for FIG. 3, the Coriolis forces diminish and ultimately become zero when the deflection of flow tube 200 in the drive mode reaches its maximum in either an upwards or downward direction. At this time, the velocity of the flow tube is zero and so are the applied Coriolis forces and resultant Coriolis deflection. Thus, the sinusoidal Coriolis response shown in FIG. 4 varies sinusoidally in amplitude at the drive frequency as flow tube 200 is vibrated sinusoidally in its first bending mode between its maximum positive and negative deflection. The amplitude of the Coriolis displacement shown on FIGS. 4 and 5 is greatly exaggerated for clarity. The amplitude is in reality much less than the amplitude of the first bending (drive) mode of flow tube 200 because the first bending mode is driven at the resonant frequency of the flow tube and the Coriolis mode is not. Thus, the Coriolis deformations shown in all the figures are greatly exaggerated.

The phase delay associated with material flow in prior art meters is the result of the superposition of the first bending (drive) mode and the Coriolis deflection of the flow tube. In FIG. 4 it can be seen that right sensor SR crosses zero displacement before left sensor SL. It can be said that the left sensor and its output voltage lag the phase of the right sensor and its output voltage. Conversely, it can also be said that right sensor SR leads the phase of left sensor SL. The phase difference (or time delay) is proportional to the amplitude of the Coriolis induced displacement which is, in turn, proportional to the mass flow rate.

In idealized single straight tube Coriolis flowmeters, the balance bar only vibrates in the first bending mode and lacks any significant response to Coriolis forces on the flow tube. FIG. 5 shows a single straight tube Coriolis flowmeter 500 having a flow tube 200 and a balance bar 502 connected by brace bars 503 and 504 at the ends of balance bar 502. The solid lines of FIG. 5 show flow tube 200 and balance bar 502 as they cross zero displacement axis 203 in the first bending (drive) mode with material flow. No Coriolis deflections appear on balance bar 502 on FIG. 5. The dashed lines show the flow tube and balance bar at the outward extent of their vibration in the first bending (drive) mode.

Figure 6:
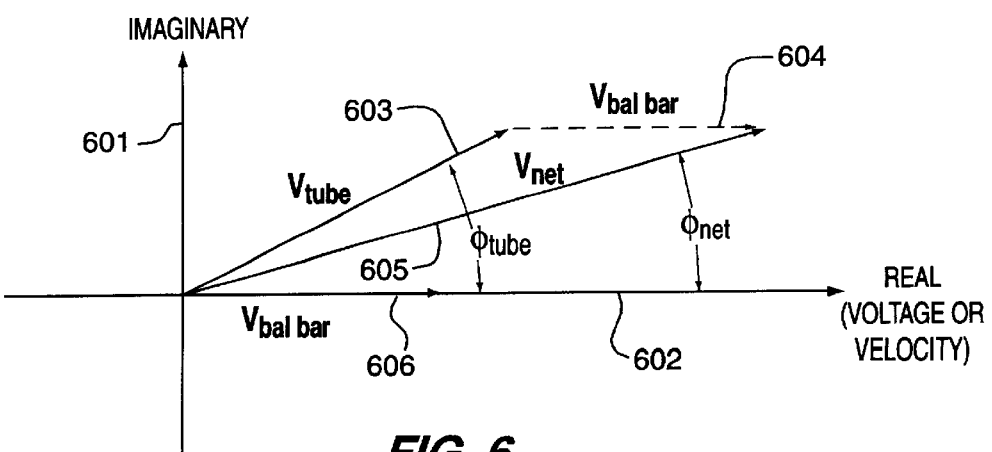
FIG. 6 discloses a vector diagram for the output signal of a pickoff of the prior art meter of FIG. 5.

Description of FIG. 6

FIG. 6 is a vector diagram disclosing the vibrational velocities generated by the idealized single straight tube Coriolis flowmeter of FIG. 5. The length of vectors $V_{tube}$ 603 and $V_{bal\ bar}$ 606 represent the peak velocities of the flow tube and the balance bar while the vector $V_{net}$ 605 represents the sum of the velocity vectors of the balance bar vector 606 and the flow tube vector 603. These vectors rotate around the origin with one revolution representing one tube cycle in the drive mode. The projection of the vectors onto the x-axis represents the real velocity (or voltage in the case of the net vector). The angle the vectors make with the x-axis represents their phase. FIG. 6 represents the right pickoff of the meter of FIG. 5 at the time illustrated by the solid lines in FIG. 5. The response of flow tube 200 at the right sensor SR is vector 603 which has a leading phase, φ tube, represented by the angle between vector 603 and the real axis 602. The phase is positive because pickoff magnet SR has already passed through the zero displacement position of the flow tube at the time that the driver D is passing through the zero position. The vibration velocity of balance bar 502 is not shifted in-phase from axis 602 since the balance bar is not significantly affected by the generated Coriolis forces on the flow tube and the entire balance bar 502 is at this instant passing through the zero displacement position. The balance bar vector (606) is shown along the real axis 602 and is entitled $V_{bal\ bar}$. The vector sum of the flow tube and balance bar velocities is vector $V_{net}$ 605. Vector 605 has a phase angle $\phi_{net}$ representing the combined vector velocities and phases of the flow tube and balance bar. This net phase angle is the means by which mass flow is measured. Note that the net phase angle out of the right pickoff SR is less than the phase angle for the flow tube alone. The reduction in-phase angle (and sensitivity) is due to the lack of significant phase shift of the balance bar in the ideas single tube meter of FIG. 5.

Figure 7:
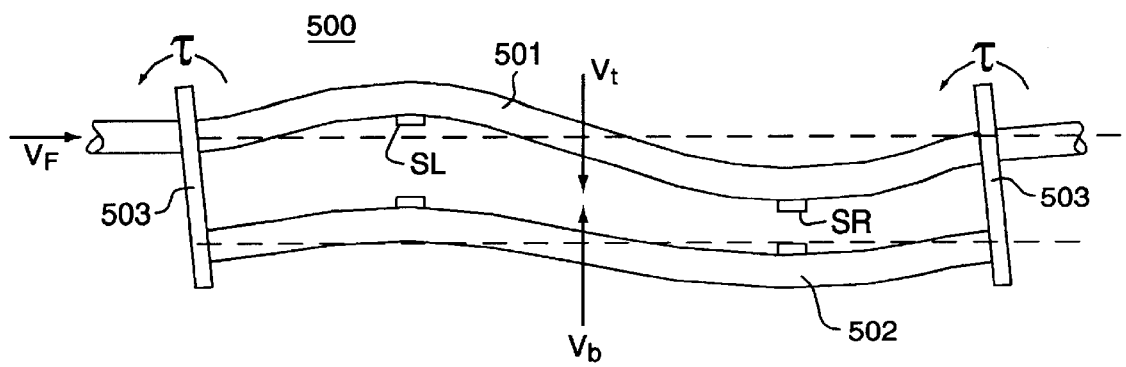
FIG. 7 discloses the Coriolis deformation of a prior art straight single tube flowmeter.

Description of FIG. 7

The prior art balance bar 502 of FIG. 5 is an idealization because the balance bar in reality is deformed indirectly by the Coriolis force. While the Coriolis force does not act directly on the balance bar, it applies a torque to each end of the balance bar via brace bars 503. The balance bar 502 deformation as shown in FIG. 7 appears similar in shape and in-phase to the Coriolis deformation of flow tube 501; only the deformation is smaller. The in-phase Coriolis like deformation of the balance bar, however, results in a velocity vector of the balance bar that is actually of opposite sign as the phase of the flow tube velocity vector. The reason for this seeming paradox is that flow tube 501 and balance bar 502 are moving in opposite directions in the drive mode as shown by velocity vectors $V_t$ and $V_b$ in FIG. 7. These vectors represent the flow tube and balance bar velocities at the driver. It is because the flow tube and balance bar are vibrating in opposite directions that deformation in the same direction (in-phase deformation) adds to the phase of one while subtracting from the phase of the other. Thus, the magnet of the left hand sensor SL (on the flow tube) has not yet crossed the dashed line representing zero displacement of the flow tube while the coil of the left hand sensor (on the balance bar) has already crossed the dashed line representing zero displacement of the balance bar. The magnet on the flow tube would thus be said to have negative phase while the coil would have positive phase. The same logic holds for the right hand pickoff SR; only the signs of the phases are reversed. The magnet on the flow tube has already passed through the zero displacement line and has positive phase while the coil on the balance bar has not yet passed through the zero displacement line and has negative phase. This in-phase balance bar deformation is undesirable because it reduces the phase delay between the pickoff signals further than does the idealized meter of FIG. 5.

Figure 8:
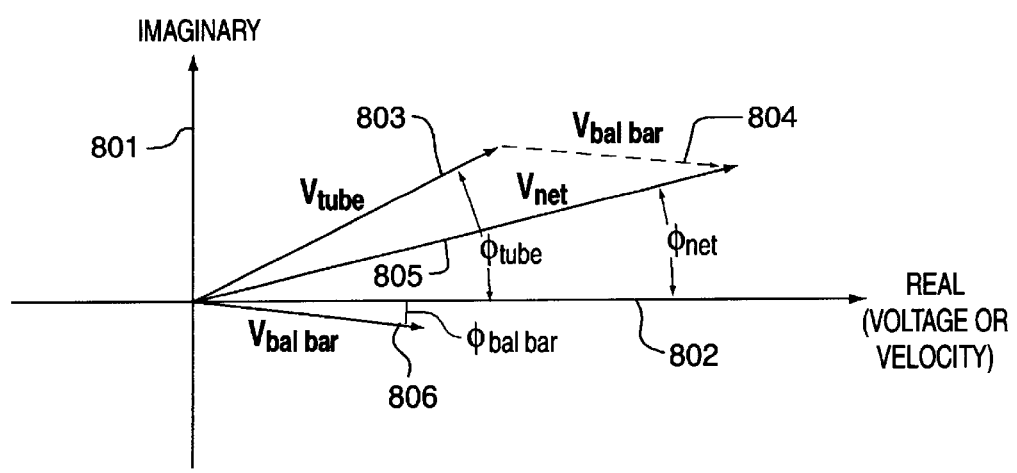
FIG. 8 discloses the vector diagram for the output signal of a pickoff of the meter of FIG. 7.

Description of FIG. 8

FIG. 8 is the vector diagram for the right pickoff SR output signal of the typical prior art meter with flow shown in FIG. 7. In FIG. 8, balance bar velocity vector 806 has negative phase (it has not yet crossed zero) that is added to flow tube vector 803 which has positive phase (it has already crossed zero). The result is that the net vector 805 (or output voltage) has a lower phase angle than the idealized meter of FIGS. 5 and 6. The reduced phase angle results in a less sensitive meter and thus a smaller output signal than the ideal meter of FIG. 5.

Figure 9:
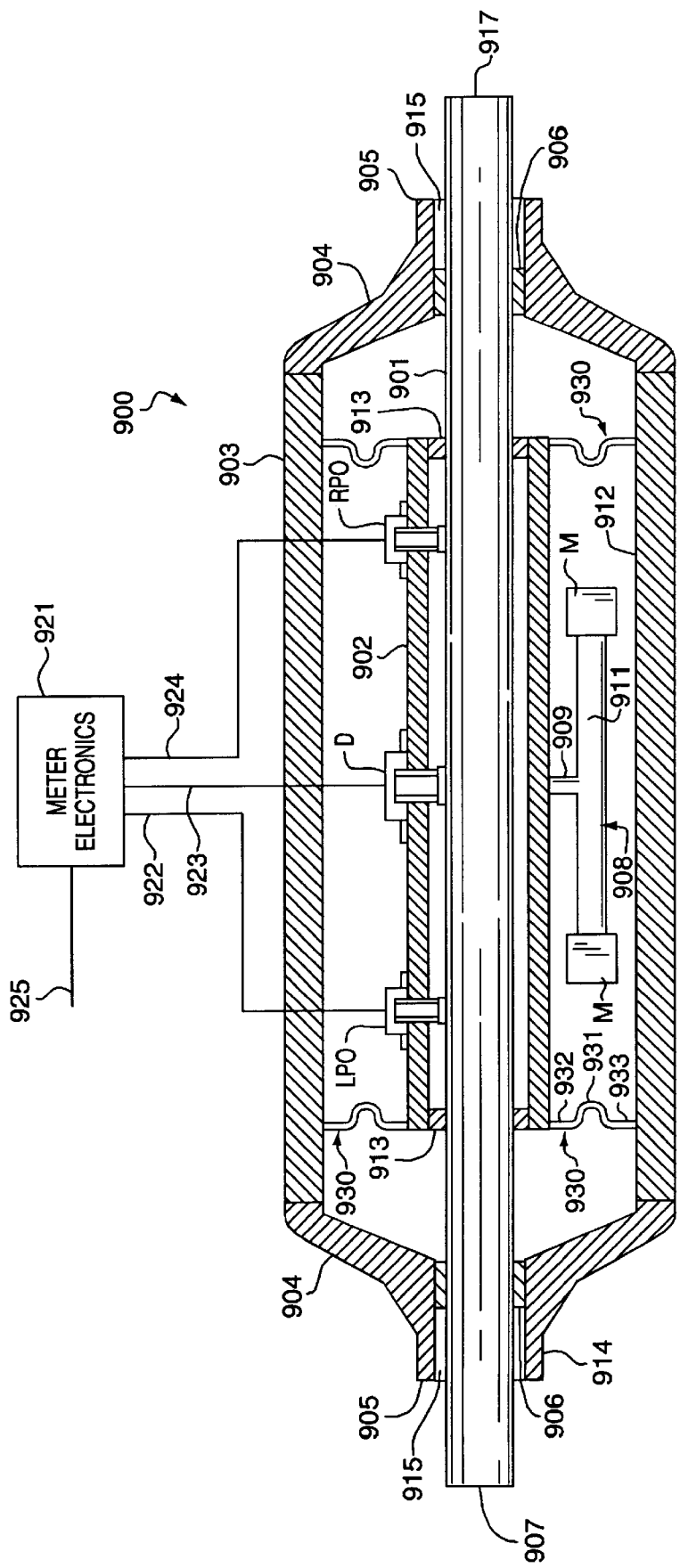
FIG. 9 discloses a straight tube Coriolis flowmeter embodying the invention.
Figure 10:
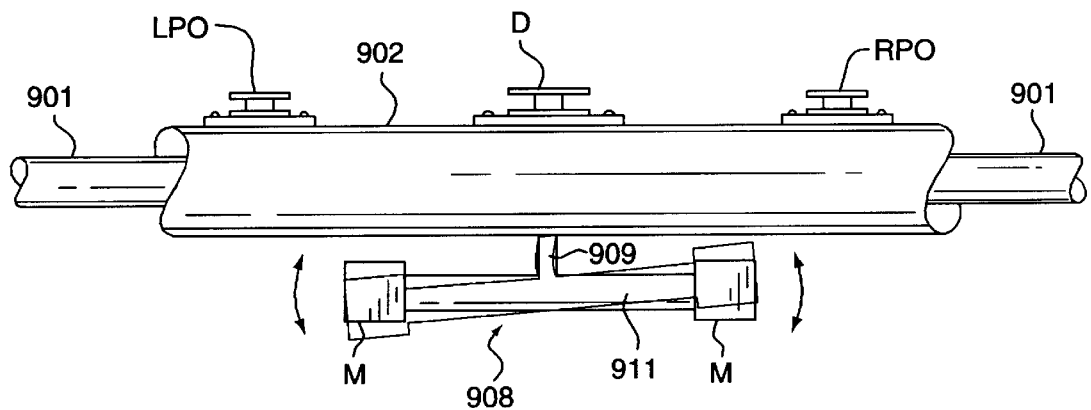
FIG. 10 discloses a cut away drawing of a first possible exemplary embodiment of the balance bar resonator.

Description of FIGS. 9 and 10

One possible exemplary embodiment of the invention, as shown in FIG. 9, discloses a straight single tube Coriolis flowmeter 900 having an outer case 903 enclosing a flow tube 901, a cylindrical balance bar 902 which surrounds the middle portion of flow tube 901 and brace bars 913 which connect the ends of balance bar 902 to flow tube 901. Flow tube 901 extends from its input end 907 through the entirety of the flowmeter 900 to its exit end 917. Case 903 includes end portions 904 on the left and right. Case 903 includes end lip portions 905 at the neck elements 914 of the case.

Connecting rings 906 are positioned within annular openings 915 within the interior of neck elements 914. Connecting rings 906 sealably engage the end portions of flow tube 901 to end portions 904 of case 903. Flowmeter 900 also has case connect links 930 connected at inner end 932 to balance bar 902 and at an outer end 933 to inner wall 912 of case 903. Case connect links 930 also have an out of plane bend 931.

Flow tube 901 is vibrated by driver D which is coupled to both flow tube 901 and balance bar 902. Flow tube 901 and is also coupled to left pickoff LPO and right pickoff RPO which are positioned on opposites sides of driver D. Meter electronics 921 applies signals over path 923 to driver D to drive flow tube 901 and balance bar 902 in-phase opposition. The vibration of the flow tube and the material flow applies Coriolis forces to the flow tube 901 distorting it. The tube distortions are detected by pick offs LPO and RPO. The output signals of the pick offs are transmitted over paths 922 and 924 to meter electronics 921 which processes the signals, determines the phase difference between the signals and outputs information representing the material flow over path 925 to an end user.

The Coriolis force of the flowing material and the vibrations of flow tube 901 induces Coriolis deflections in the flow tube which deform the shape of the vibrating flow tube. This deformation, which is shown exaggerated in FIG. 4, causes different locations along the flow tube to vibrate with sightly different phases. Each point along the vibrating flow tube has Coriolis sinusoidal motion during material flow, but the points do not reach their maximum displacement or zero displacement location simultaneously. The center of the vibrating flow tube experiences no change with material flow while the inlet portions of the flow tube experience phase lag and the outlet end of the flow tube experience leading phase. The points of the flow tube having maximum phase lag and lead are at the inlet and outlet ends of the vibrating portion of the flow tube. These ends are defined by nodes and are locations of zero vibration amplitude.

The difference in-phase between two location on flow tube 901 is the means by which flow rate is determined by meter electronics 921. The velocity (or displacement or acceleration) pick offs LPO and RPO are located at two locations along flow tube 901. The time delay (phase difference divided by drive frequency) between the pickoff outputs is directly proportional to the mass flow rate through vibrating flow tube 901.

In conventional prior art straight tube flowmeters, balance bar 902 is used primarily to counter balance the vibrating mass of the flow tube. The balanced vibrational structure comprises flow tube 901, brace bars 913 and balance bar 902. In use, balance bar 902 and flow tube 901 are vibrated in-phase opposition by driver D at the resonant frequency of these structures including the material filled flow tube 901. Sinusoidal Coriolis deflections are induced in the flow tube 901 as a result of the material flow though the vibrating flow tube. These Coriolis deflections occur at the drive frequency of the material filled vibrating flow tube 901. The balance bar 902 does not experience direct Coriolis forces since it does not experience a material flow through it as does flow tube 901. However, brace bars 913 provide a path for the communication of vibrations from the flow tube to balance bar 902. As a result, the Coriolis force induced distortion of flow tube 901 transmits torques to balance bar 902 via brace bars 913. In conventional prior art meters, these torques cause a small amplitude of Coriolis like deflections to appear on balance bar 902 as shown in FIG. 7. These Coriolis like deflections reduce the net phase difference out of the pick offs. The reduced Coriolis signals generated by pick offs LPO and RPb are applied over paths 922 and 924 to meter electronics 921 which determines material flow information from the phase difference between the output signals of sensors LPO and RPO.

The present invention includes balance bar resonator 908. This is a bar 911 with its longitudinal axis parallel to the longitudinal axis of the flow tube. The balance bar resonator bar is relatively stiff and has mass along its length and masses m at its ends. Balance bar resonator bar 911 is attached at its midpoint to the midpoint of balance bar 902 by strut 909. The strut is sized so as to position the resonant frequency of the rotation mode of the balance bar resonator (dotted lines in FIG. 10) slightly below the drive frequency. The Coriolis induced deflection of flow tube 901 deforms balance bar 902 slightly as shown in FIG. 7 by way of brace bars 913. The deformation of the balance bar in the Coriolis like deflection of FIG. 7 excites the rotation mode of the balance bar resonator as shown in FIG. 10. The balance bar resonator motion is 180 degrees out of phase with the balance bar Coriolis like deflection because the balance bar resonator's resonant frequency is below the excitation (drive) frequency. The deformation of the balance bar resonator in the rotation mode applies a torque to the balance bar via balance bar resonator strut 909. This torque greatly reduces the Coriolis like deformation of the balance bar and thereby increases the sensitivity of the flowmeter to nearly that of the idealized single tube flowmeter of FIG. 5.

FIG. 10 illustrates the flowmeter of FIG. 9 with case 903 and its end portions removed. Also meter electronics and its associated wires are not shown to minimize drawing complexity. In operation, flow tube 901 is subject to Coriolis forces which cause the flow tube to assume sinusoidal S shaped deflections. This is shown in FIG. 7. These Coriolis deflections of flow tube 901 apply a torque to each end of the balance bar via brace bars 913 of FIG. 9 to balance bar 902 to cause it to assume Coriolis like deflections that are out of phase with those on flow tube 901 but of a smaller amplitude as shown on FIG. 7. As previously mentioned, the in-phase Coriolis like deflections of the balance bar are undesirable since they reduce the effective phase delay available from each of pickoff LPO and RPO.

The provision of balance bar resonator 908 reduces the Coriolis like deflections of the balance bar 902 by functioning as a dynamic balancer. Thus, when the center portion of the balance bar rotates counter-clockwise as a result of the Coriolis deflection of the flow tube, bar 911 with the mass M at each end rotates in a clockwise direction and resists the counter-clockwise rotation of balance bar 902. This reduces the attempted counter-clockwise movement of balance bar 902 due to vibratory forces received from the flow tube 901 via brace bars 913. Likewise, when the center of balance bar 902 attempts to rotate clockwise, balance bar resonator 908 rotates counter-clockwise reducing clockwise rotation of the balance bar. This sinusoidal rotation of balance bar 902 is effectively canceled by the rotation of balance bar resonator 908. Thus, the balance bar resonator 908 effectively functions as a dynamic balancer and cancels or minimizes any rotation of balance bar 902 due to the Coriolis signals applied by the flow tube 901 by brace bar 913 to balance bar resonator 908.

Figure 11:
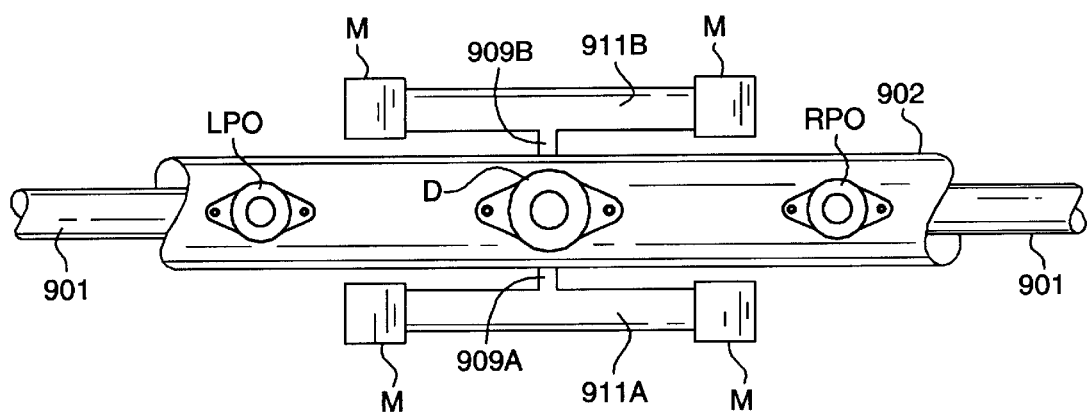
FIG. 11 discloses a cut away drawing of a second possible exemplary embodiment of the balance bar resonator.

Description of FIG. 11

FIG. 11 is similar to FIG. 10 except that it shows a pair of balance bar resonators 908A and 908B. Balance bar resonator 908B is affixed to one side of an axial center portion of balance bar 902 while balance bar resonator 908A is affixed to the opposite side of balance bar 902. This differs from the showing of FIG. 10 where balance bar resonator 908 is affixed to the bottom portion of balance bar 902. The principal of operation of the embodiment of FIG. 11 is identical to that of FIG. 10. Namely, balance bar resonators 908A and 908B together function as dynamic balancers which effectively minimize the rotation of balance bar 902 due to Coriolis vibrations imparted to balance bar 902 from flow tube 901 via brace bar 913 shown on FIG. 9.

In FIG. 11 struts 909A and 909B connecting the balance bar resonator bars to the balance bar are deflected in torsion rather than bending as does strut 909 of FIGS. 9 and 10. The dual balance bar resonators apply torque to the balance bar like the single balance bar resonator of FIGS. 9 and 10 with the same result.

The vibration amplitude of the balance bar in the drive mode is also a factor in determining useful flowmeter output information. In order to maintain a vibrational balance over a range of material densities encountered by the flowmeter, the ratio of flow tube vibration amplitude in the drive mode to the balance bar vibrational amplitude in the drive mode should change as the material density changes. However, such a change in amplitude ratio can cause changes in the flow calibration factor of the flowmeter. Each pickoff produces a voltage proportional to the relative velocity between its magnet on the flow tube and its coil on the balance bar. The velocity of the magnet on the flow tube experiences a phase shift with material flow while the velocity of the coil on the balance bar experiences a slight phase shift of the opposite sign or a zero phase shift in the present invention. The net voltage out is the result of the vector addition of the phase shifted velocity of the flow tube and the zero or negatively phase shifted velocity of the balance bar. Thus the net phase shift of each sensor output signal is decreased from the flow tube phase shift by the balance bar amplitude and phase. Furthermore as the amplitude ratio shifts with material density, the flow sensitivity of the flowmeter changes.

Figure 12:
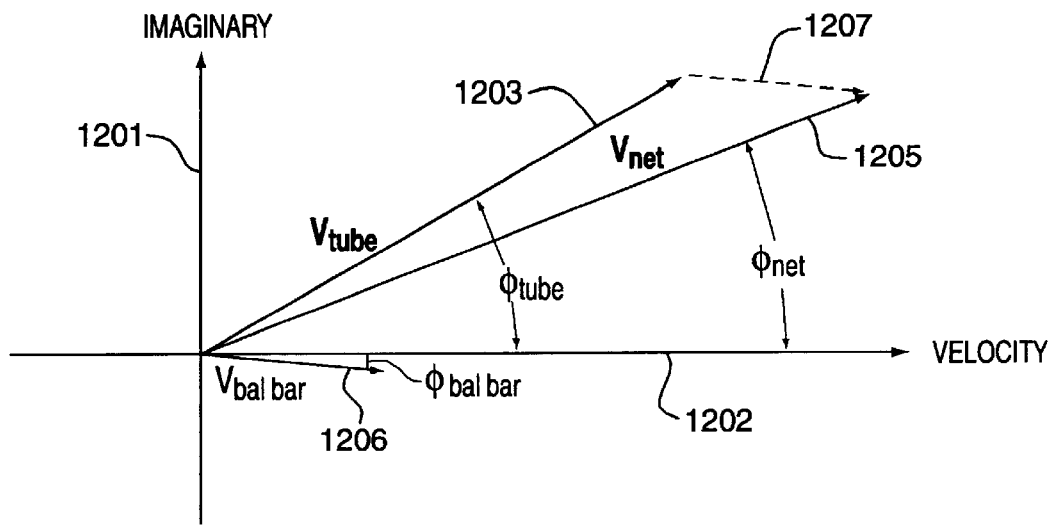
FIG. 12 discloses a vector diagram of a pickoff signal of a prior art meter measuring a low density material.
Figure 13:
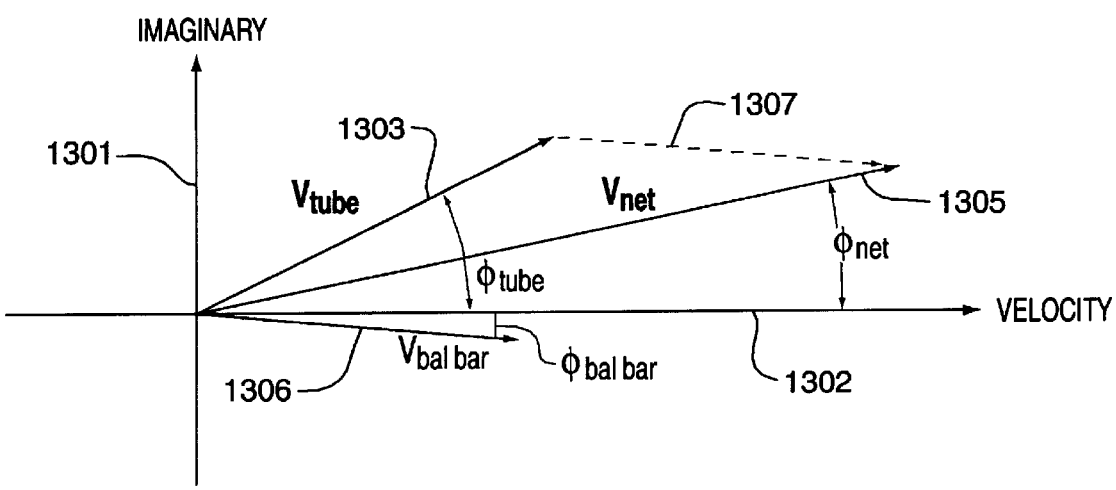
FIG. 13 discloses a vector diagram of a pickoff signal of a prior art meter measuring a high density material.

Description of FIGS. 12 and 13

The balance bar resonator is also be used to make the flow calibration factor independent of material density. FIGS. 12 and 13 show the effect of changing material density on the output signal phase of the prior art meter of FIG. 7. A comparison between the phase diagrams of a meter for two different density materials would normally be meaningless because the density difference results in a shift in drive frequency as well as tube phase. Therefore, the phase angles for these diagrams have been "normalized" for frequency. This means that the phase angles have been divided by the drive frequency. The normalized phase angles are in reality time delay. Since Coriolis force and thus phase angle is proportional to tube frequency, the normalized flow tube phase angles for the same mass flow rare and different densities should be equal for a flowmeter having a constant flow sensitivity.

FIG. 12 is a normalized vector diagram for the pickoff output signal of a prior art meter at a given flow rate of a low density material. The length of the vectors is proportional to the velocity while the angle from the x-axis represents the phase angle of the component when the tube center point crosses the zero displacement position. The low density material results in a high flow tube amplitude and a low balance bar amplitude (to conserve momentum and maintain meter balance). The vector sum $V_{net}$ 1205 of the flow tube vector 1203 and the balance bar vector 1202 results in a relatively high net phase angle $\phi_{net}$ (normalized). FIG. 13 is a normalized vector diagram for the same meter at the same mass flow rate only with a material of much higher density.

The flow tube normalized phase angle $\phi_{tube}$ is the same as in FIG. 12 and the balance bar phase angle $\phi_{balance\ bar}$ is the same as in FIG. 12. However, the flow tube amplitude has decreased and the balance bar amplitude has increased resulting in a reduced normalized phase angle $\phi_{net}$ of the vector sum 1305. This change in the normalized net phase angle with material density results in a decrease in meter flow sensitivity with material density.

Figure 16:
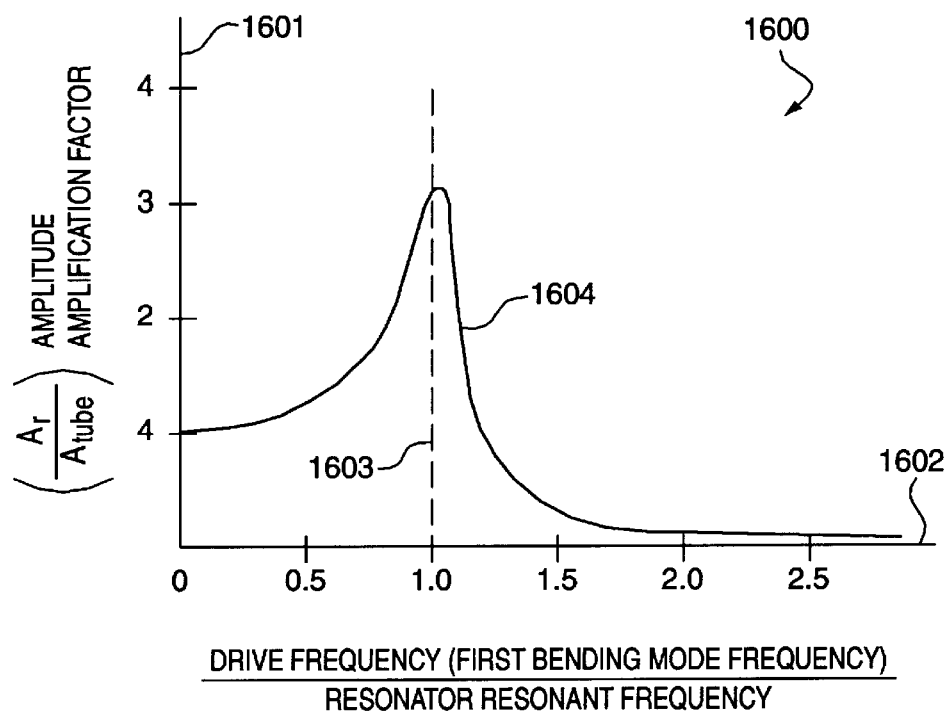
FIG. 16 is a graph of the vibration amplitude of the balance bar resonator with respect to the ratio of the drive frequency to the balance bar resonator resonant frequency for a given flow rate.
Figure 17:
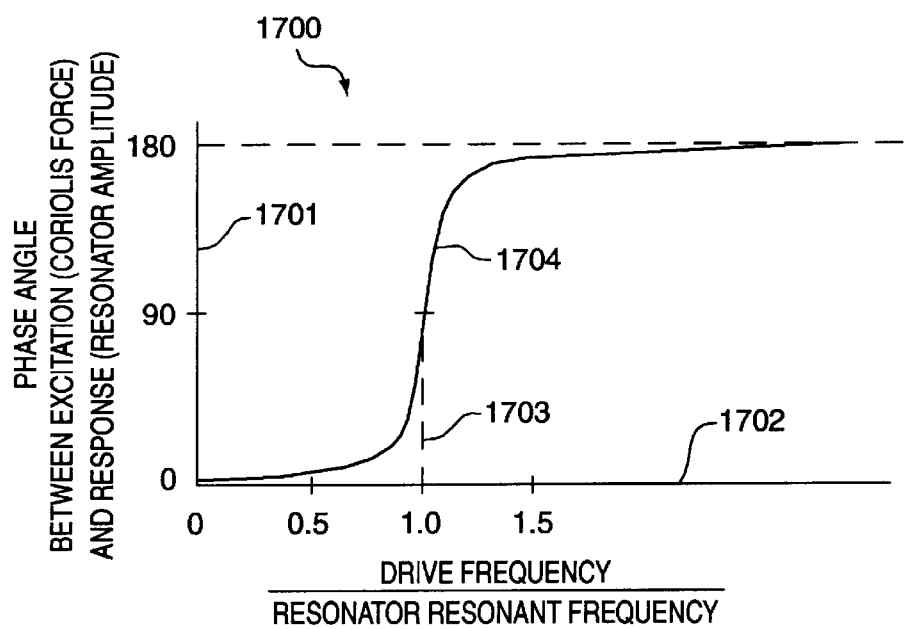
FIG. 17 is a graph of the phase difference between the vibration of the balance bar resonator and the vibration of the balance bar with respect to the frequency ratio.

Description of FIGS. 16 and 17

The current invention embodying the balance bar resonator, solves this problem of changing flow calibration factor because of changing material density. It eliminates the density effect on flow sensitivity by using the change in the balance bar resonator amplitude with the change in frequency separation between the drive frequency and the balance bar resonator resonant frequency. FIG. 16 is a typical frequency response curve. It shows the vibration amplitude of the balance bar resonator as a function of the ratio between the drive frequency and the resonant frequency of the working mode of the balance bar resonator. It can be seen that when the frequency ratio is very close to 1.0, balance bar resonator amplitude becomes very large. FIG. 17 shows the phase relationship between the Coriolis like deflection of the balance bar and the balance bar resonator deflection in its working mode. It shows that for the situation where the drive frequency is higher than the resonant frequency of the working mode of the balance bar resonator, the phase angle between them is 180 degrees.

The drive frequency increases for low density materials and decreases for high density materials while the resonant frequency of the balance bar resonator is fixed at a frequency below that of the high density material. This means that frequency separation is less (the frequency ratio is closer to 1) for high density materials than for low density materials and, as a result, the balance bar resonator amplitude for a given mass flow rate is higher for a high density material. The higher balance bar resonator amplitude results in a lower Coriolis like deflection of the balance bar and a balance bar pickoff vector that is less negative than that of a low density material.

Figure 14:
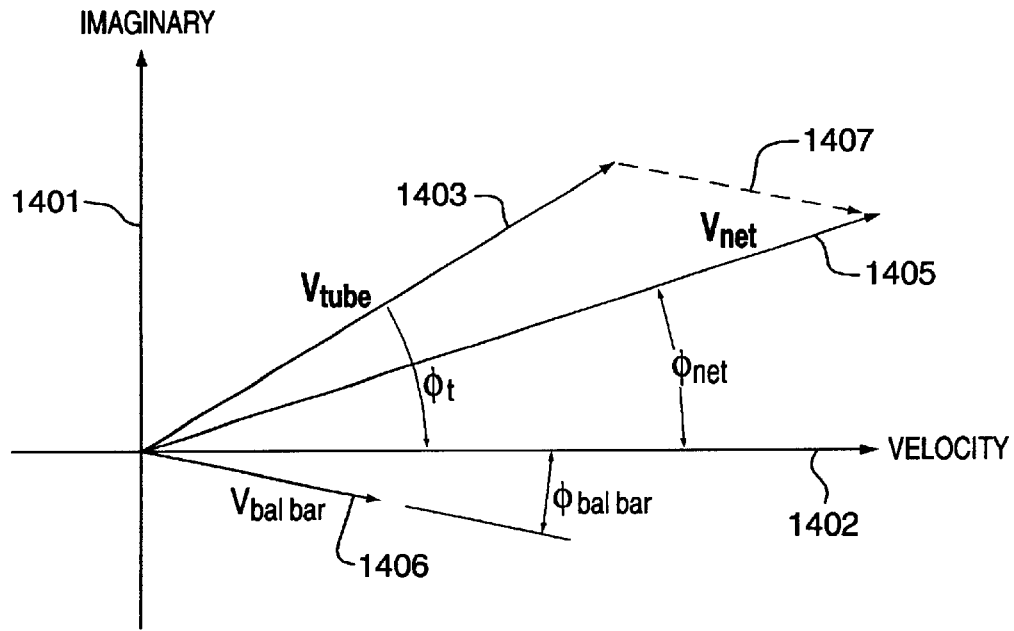
FIG. 14 discloses a vector diagram of a pickoff signal of the present invention measuring a low density material.
Figure 15:
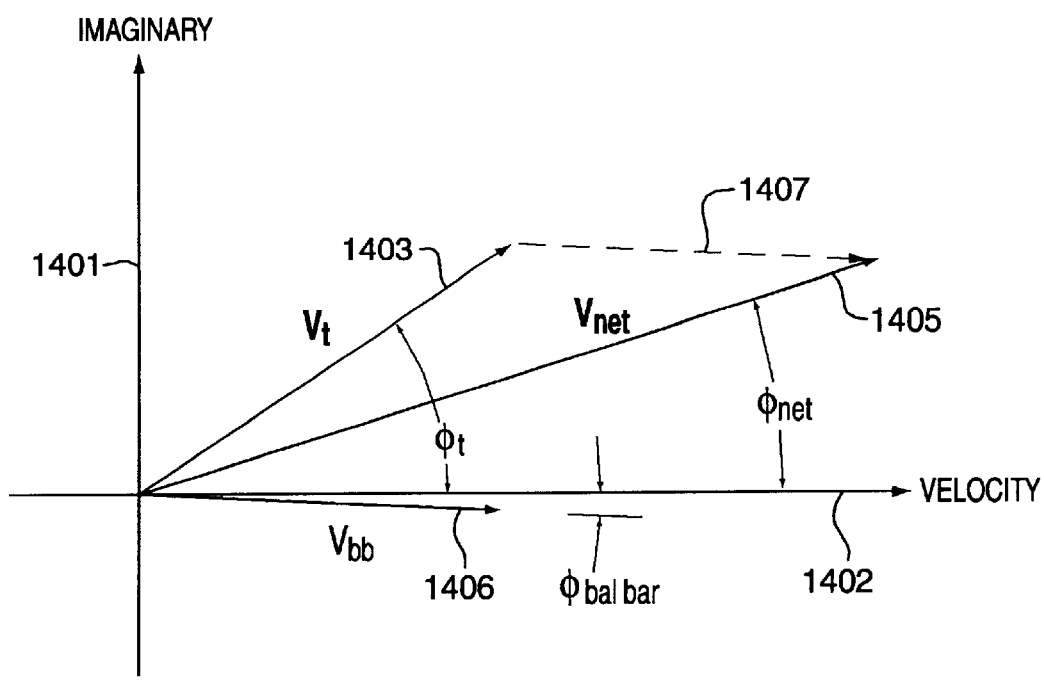
FIG. 15 discloses a vector diagram of a pickoff signal of the present invention measuring a high density material.

Description of FIGS. 14 and 15

FIGS. 14 and 15 illustrate how the density effect is eliminated. FIG. 14 is a normalized vector diagram of a pickoff output signal for a low density material. The flow tube vibration amplitude is high resulting in a high flow tube velocity and a long velocity vector 1403. The drive frequency is also high due to the low density material. The high drive frequency results in a large frequency separation between the drive frequency and the fixed resonant frequency of the balance bar resonator. The large frequency separation means that the balance bar resonator amplitude is small and the balance bar is deformed by the Coriolis deflection of the flow tube via the brace bars. As a result, balance bar velocity vector 1406 has a relatively large negative phase angle.

FIG. 15 is a normalized vector diagram for the same meter and the same mass flow rate as FIG. 14; but it is for a high density material. The flow tube amplitude is decreased while the balance bar amplitude is increased from the vectors of FIG. 14. This results in flow tube vector 1403 decreasing in length and balance bar vector 1406 increasing in length in FIG. 15. Also the higher density material decreases the drive frequency resulting in a lower frequency separation between the drive frequency and the resonant frequency of the balance bar resonator. The decreased frequency separation results in greater balance bar resonator amplitude (as shown in FIG. 16) and a decreased balance bar Coriolis like deformation. This means that the balance bar vector 1406 has a smaller negative phase angle. The reduction in the balance bar negative phase angle enables the net vector 1405 of FIG. 15 to have the same phase angle and amplitude as the net vector 1405 of FIG. 14. Since the net vectors 1405 have the same phase angle and amplitude, the flow sensitivity of the meter is the same for the two different density materials. This solves the density sensitivity problem of prior art meters.

The balance bar resonators of FIGS. 9, 10, and 11 have an additional advantages besides increasing the flowmeter sensitivity and making the meter's flow sensitivity independent of material density. It can be seen in FIG. 3 that the Coriolis force puts an unbalanced torque on the flow tube. If unrestrained, the flow tube of FIG. 3 would rotate in a clockwise direction at the instant pictured in the tube cycle. As the tube vibration direction changes, the torque direction and rotation direction also change. The prior art balance bar of FIG. 7 does nothing to counter the unbalanced torque which is transferred via the case connect links and the inactive portions of the flow tube to the case and flanges. This causes the entire flowmeter to vibrate at drive frequency with the ends of the flowmeter vibrating out of phase with each other at drive frequency and at an amplitude that is proportional to flow rate.

The vibration of the entire flowmeter is undesirable because it adds to or subtracts from the Coriolis acceleration of the material. The additional acceleration, while proportional to flow rate, is generally unknown because it depends on the stiffness of the meter mounting. Stiff mounting of the meter reduces the spurious acceleration (shaking) while soft mounting increases it. The unknown spurious acceleration thus results in a meter error.

The present invention decreases the severity of this problem of meter vibration due to the unbalanced Coriolis force by way of the balance bar resonator. The balance bar resonator acts like a dynamic balancer in that it increases its amplitude of vibration until it applies enough torque to the balance bar to reduce the excitation displacement to near zero. The excitation of the balance bar resonator can come from two sources. It can come from the Coriolis like deformation of the balance bar and it can come from the Coriolis induced shaking of the entire meter. Either source can excite the balance bar resonator and increase its rotation mode amplitude. As can be seen in FIG. 10, the bending of balance bar resonator 108 strut applies a torque that is opposite to the torque that is applied to the flow tube by the Coriolis acceleration of the material. This torque can both reduce the deformation of the flow tube and indirectly, by way of the case connect links and the inactive tube regions, reduce the case shaking.

The degree to which the balance bar resonator reduces Coriolis like deformation of the balance bar and Coriolis force induced shaking of the entire meter is a function of the separation between the drive frequency and the resonant frequency of the rotation mode of the balance bar resonator. This is made evident by the typical frequency response curve of FIG. 16. If the two frequencies are equal, the balance bar resonator almost completely negates the balance bar Coriolis like deformation and the Coriolis induced shaking of the meter. As frequency separation increases, the effect of the balance bar resonator decreases. Also, it is important that the resonant frequency of the balance bar resonator be below the drive frequency. FIG. 17 show that If the balance bar resonator resonant frequency is above the drive frequency, the balance bar resonator bar oscillates in-phase with the deformation of the balance bar and increases the deformation amplitude and the meter shaking. Because the drive frequency is inversely proportional to material density, it is best to place the balance bar resonator frequency sufficiently below the drive frequency so that the highest density material allowable will not cause the drive frequency to go below the balance bar resonator resonant frequency.

The balance bar resonator offers three areas of improvement over previous meters. They are increased flow sensitivity, countering of the shaking torque due to the Coriolis force, and elimination of the density effect on flow sensitivity. The first two improvements are maximized by having the balance bar resonator resonant frequency as close to drive frequency as is feasible. The third improvement, the elimination of the density effect is optimized by spacing the frequencies so that the decrease in sensitivity due to the changing of the amplitude ratio with density is just countered by the increase in sensitivity due to elimination of the Coriolis like deformation of the balance bar.

In the figures showing the deformed mode shapes a meter having the balance bar beside the flow tube has been employed. This geometry has been used for the figures because of its increased clarity. The principals concerning the present invention apply equally well to the side by side geometry and the concentric tube geometry of FIGS. 9, 10, and 11. Likewise, all figures have employed single straight tubes whereas the principals apply equally well to single bent tube meters.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube Coriolis flowmeter, it is to be understood that the present invention is not so limited and may be used with other types of Coriolis flowmeters including single tube flowmeters of irregular or curved configuration as well as Coriolis flowmeters having a plurality of flow tubes. It is to be understood that the term "material" includes slurries, syrups, liquids of any density, gasses, and plasmas.

What is claimed is:

1. A Coriolis flowmeter that, in use, receives a material flow, said Coriolis flowmeter comprises:

a flow tube and a balance bar oriented substantially parallel to said flow tube;

brace bar element coupling end portions of said balance bar to said flow tube;

balance bar resonator element coupled to said balance bar;

a driver coupled to said flow tube and said balance bar that vibrates said flow tube and balance bar out of phase with respect to each other in a drive mode having a frequency substantially equal to the resonant frequency of said material filled flow tube and said balance bar;

said material flow applies periodic Coriolis forces to said vibrating flow tube to generate periodic Coriolis deflections of said flow tube that are characterized by regions of deflection as well as nodes having no deflection;

said brace bar element is responsive to said Coriolis deflections of said flow tube to generate periodic Coriolis like deflections of said balance bar that are characterized by regions of deflection as well as nodes having no deflection;

said Coriolis like deflections of said balance bar are in-phase with and have the same number of nodes as said periodic Coriolis deflections of said flow tube;

said Coriolis like deflections include a rotation of a longitudinal center portion of said balance bar;

said in-phase Coriolis like deflections of said balance bar excite said balance bar resonator element to vibrate in a rotational mode out of phase with respect to said rotation of said longitudinal center portion of said balance bar;

pick off element coupled to said flow tube that generate signals representing the vibrational velocity of said flow tube with respect to the vibrational velocity of said balance bar;

apparatus whereby the vibration of said balance bar resonator element in said rotational mode applies torque to said balance bar that enables output information generated by said Coriolis flowmeter to have increased accuracy; and meter electronics responsive to said pick off element that derives information regarding said material flow in response to said generation of said signals of increased accuracy.

2. The Coriolis flowmeter of claim 1 wherein said apparatus that increases the accuracy of said output information of said Coriolis flowmeter comprises:

apparatus, including said balance bar resonator element, that applies torque from said balance bar resonator element to said balance bar to decrease the amplitude of said Coriolis like deflections of said balance bar;

apparatus that increases the relative velocity of said Coriolis deflections of said flow tube with respect to said in-phase Coriolis like deflections of said balance bar in response to said decrease of said amplitude of said in-phase Coriolis like deflections of said balance bar; and apparatus which increases the flow sensitivity of said Coriolis flowmeter in response to said increase in said relative velocity of Coriolis deflections of said flow tube with respect to said in-phase Coriolis like deflections of said balance bar.

3. The Coriolis flowmeter of claim 1 wherein said Coriolis forces apply torque to said flow tube that causes shaking of said Coriolis flowmeter; said apparatus that increases the accuracy of said output information of said Coriolis flowmeter comprises:

apparatus that extends torque applied by said balance bar resonator element to said balance bar and via said balance bar to said flow tube to reduce torque applied by said flow tube to meter mounts of said Coriolis flowmeter;

said reduction of said torque applied by said flow tube to said meter mounts is effective to reduce the shaking of said Coriolis flowmeter.

4. The Coriolis flowmeter of claim 1 wherein said apparatus that increases the accuracy of said output information of said Coriolis flowmeter comprises:

apparatus that detects a change in the resonant frequency of said vibrating flow tube and said balance bar in said drive mode resulting from a change in the density of said flowing material;

apparatus that changes the vibrational amplitude ratio of said flow tube and said balance bar in said drive mode in response to said detection of said change in material density;

apparatus that changes material flow sensitivity of said Coriolis flowmeter in a first direction in response to said change in vibrational amplitude ratio;

apparatus that alters the vibrational amplitude of said balance bar resonator to change said material flow sensitivity in a second direction in response to said change in said resonant frequency;

said changes in flow sensitivity in said first direction and in said second direction are effective to achieve a flow calibration factor of said Coriolis flow meter.

5. The Coriolis flowmeter of claim 1 wherein said apparatus that induces said in-phase Coriolis like deflections in said balance bar includes apparatus that extends forces indicative of said periodic Coriolis deflections from said flow tube through said brace bar element to said balance bar to induce said in-phase Coriolis like deflections in said balance bar.

6. The Coriolis flowmeter of claim 1 further including apparatus that couples said balance bar resonator element to said longitudinal center portion of said balance bar.

7. The Coriolis flowmeter of claim 1 wherein said balance bar resonator element comprises:

an elongated bar substantially parallel to said balance bar at a rest state of said Coriolis flowmeter;

a stub coupling said elongated bar to the longitudinal center portion of said balance bar:

the vibration of said balance bar resonator element with respect to said longitudinal center portion of said balance bar applies torque to said balance bar.

8. The Coriolis flowmeter of claim 7 wherein said applied torque from said balance bar resonator reduces the amplitude of said in-phase Coriolis like deflections of said balance bar to increase the flow sensitivity of said Coriolis flowmeter.

9. The Coriolis flowmeter of claim 8 wherein said applied torque of said balance bar resonator is extended from said balance bar via brace bars to said flow tube to reduce the shaking of said Coriolis flowmeter.

10. The Coriolis flowmeter of claim 7 wherein said resonator bar includes mass.

11. The Coriolis flowmeter of claim 10 wherein said mass comprises mass element affixed to ends of said resonator bar.

12. The Coriolis flowmeter of claim 7 wherein said balance bar resonator element comprises said stub which couples said elongated bar to said longitudinal center of said balance bar on a bottom surface of said balance bar.

13. The Coriolis flowmeter of claim 7 wherein said balance bar resonator element comprises a first and a second balance bar resonator each comprising a stub and an elongated bar;

said stub of said first balance bar resonator is coupled to said longitudinal center of said balance bar on a first side of said balance bar and said stub of said second balance bar resonator is coupled to said longitudinal center of said balance bar on a second side of said balance bar.

14. The Coriolis flowmeter of claim 1 wherein said apparatus that induces said in-phase Coriolis like deflection in said balance bar includes:

apparatus that flexes ends of said flow tube in response to said periodic Coriolis deflections to flex a first end of a brace bar element; and apparatus that flexes a second end of said brace bar in response to said flexing of said first end to induce said in-phase Coriolis like deflections in said balance bar.

15. A method of operating a Coriolis flowmeter that, in use, receives a material flow and comprises a flow tube and a balance bar that is oriented substantially parallel to said flow tube; said Coriolis flowmeter also has brace bar element coupling said balance bar to said flow tube and further has a balance bar resonator element coupled to a longitudinal center portion of said balance bar;

said method comprising the steps of:
flowing material through said flow tube;
vibrating said flow tube and balance bar out of phase with respect to each other in a drive mode having a drive frequency substantially equal to the resonant frequency of said material filled flow tube and said balance bar;
said flowing material applies periodic Coriolis forces to said vibrating flow tube to generate periodic Coriolis deflections of said flow tube that are characterized by regions of deflection as well as nodes having no deflection,
inducing in-phase Coriolis like deflections in said balance bar at said drive frequency in response to said Coriolis deflections of said flow tube;
said Coriolis like deflections include a rotation of said longitudinal center portion of said balance bar;
said Coriolis like deflections being in-phase with and having the same number of nodes as said periodic Coriolis deflections of said flow tube;
said Coriolis like deflections of said balance bar excite said balance bar resonator element to vibrate in a rotational mode out of phase with respect to said rotation of longitudinal center portion of said balance bar;
the rotational mode vibration of said balance bar resonator element applies torque to said balance bar to increase the accuracy of output information generated by said Coriolis flowmeter;
operating pick offs that generate signals of increased accuracy representing a vibrational velocity of said flow tube with respect to a vibrational velocity of said balance bar; and
deriving information of increased accuracy regarding said material flow in response to said generation of said signals of increased accuracy.

16. The method of claim 15 wherein said step of increasing said accuracy of said output information of said Coriolis flowmeter includes the steps of:
decreasing the amplitude of said in-phase Coriolis like deflections of said balance bar;
increasing the relative velocity of Coriolis deflection of said flow tube with respect to said in-phase Coriolis like deflections of said balance bar in response to said reduction of said amplitude of said in-phase Coriolis like deflections of said balance bar; and
increasing said flow sensitivity of said Coriolis flowmeter in response to said increase in said relative velocity of Coriolis deflection of said flow tube with respect to said in-phase Coriolis like deflections of said balance bar.

17. The method of claim 15 wherein said Coriolis forces apply torque to said flow tube that causes shaking of said Coriolis flowmeter; and wherein said step of increasing said accuracy of said output information of said Coriolis flowmeter includes the step of:
extending said torque applied by said balance bar resonator element from said balance bar to said flow tube to reduce the torque applied by said flow tube to meter mounts of said Coriolis flowmeter;
said reduction of said torque applied to said meter mounts is effective to reduce the shaking of said Coriolis flowmeter.

18. The method of claim 15 wherein said step of increasing said accuracy of said output information of said Coriolis flowmeter includes steps of:
detecting a change in the resonant frequency of said vibrating flow tube and said balance bar in said drive mode resulting from a change in the density of said flowing material;
changing the vibrational amplitude ratio of said flow tube and said balance bar in said drive mode in response to said detection of said change in material density;
changing the material flow sensitivity of said Coriolis flowmeter in a first direction in response to said change in vibrational amplitude ratio:
altering the vibrational amplitude of said balance bar resonator to change said material flow sensitivity in a second direction in response to said change in said resonant frequency of said brace bar resonator element;
said changes in flow sensitivity in said first direction and in said second direction are effective to achieve a flow calibration factor of said Coriolis flow meter.

19. The method of claim 15 wherein said step of inducing said Coriolis like deflection in said balance bar includes the step of extending forces indicative of said periodic Coriolis deflections from said flow tube through said brace bar element to said balance bar to induce said Coriolis like deflections in said balance bar.

20. The method of claim 15 including the step of coupling said balance bar resonator element to the longitudinal center portion of said balance bar on a bottom surface of said balance bar.

21. The method of claim 15 wherein said balance bar resonator element includes a pair of elements each having an elongated bar and a stub and wherein said method includes the step of coupling the stub of each element to the longitudinal center portion of said balance bar on opposite sides surfaces of said balance bar.

22. The method of claim 15 including the step of causing said applied torque to reduce the amplitude of said in-phase Coriolis like deflections of said balance bar to increase the flow sensitivity of said Coriolis flowmeter.

23. The method of claim 15 including the step of causing said applied torque to be extended from said balance bar via brace bars to said flow tube to reduce the shaking of said Coriolis flowmeter.

24. The method of claim 15 wherein said steps of vibrating said balance bar includes the steps of:
flexing ends of said flow tube in response to said periodic Coriolis deflections to flex a first end of a brace bar element; and
flexing a second end of said brace bar in response to said flexing of said first end to induce said Coriolis like deflections in said balance bar.

* * * * *

UNITED STATES PATENT AND TRADEMARK OFFICE
CERTIFICATE OF CORRECTION

PATENT NO. : 6,363,794 B1
DATED : April 2, 2002
INVENTOR(S) : Craig Brainerd Van Cleve It is certified that error appears in the above-identified patent and that said Letters Patent is hereby corrected as shown below:

Column 14,
Line 2, replace "LPO and RPb are applied over paths 922 and 924 to meter"
with -- LPO and RPO are applied over paths 922 and 924 to meter --

Column 21,
Line 50, replace "reduction of said amplitude of said in-phase Coriolis like" with
-- decrease of said amplitude of said in-phase Coriolis like --

Signed and Sealed this

Eighteenth Day of February, 2003

JAMES E. ROGAN
*Director of the United States Patent and Trademark Office*